(12) United States Patent
Sonawane et al.

(10) Patent No.: US 11,886,415 B2
(45) Date of Patent: Jan. 30, 2024

(54) DATA RETRIEVAL FROM HIERARCHICAL INDUSTRIAL ASSET DATASETS

(71) Applicant: Baker Hughes Holdings LLC, Houston, TX (US)

(72) Inventors: Karan Sonawane, Mumbai (IN); Shreyas Lele, Mumbai (IN); Mangesh Dashmukhe, Pune (IN); Sandeep Patil, Mumbai (IN)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/348,332

(22) Filed: Jun. 15, 2021

(65) Prior Publication Data

US 2022/0398237 A1    Dec. 15, 2022

(51) Int. Cl.
*G06F 16/22* (2019.01)

(52) U.S. Cl.
CPC ........ *G06F 16/2282* (2019.01); *G06F 16/221* (2019.01); *G06F 16/2246* (2019.01)

(58) Field of Classification Search
CPC ............... G06F 16/2282; G06F 16/221; G06F 16/2246; G06F 16/282; G06F 16/23; G06F 16/25; G06F 16/2255; G06F 16/2445
See application file for complete search history.

(56) References Cited

U.S. PATENT DOCUMENTS

| | | | |
|---|---|---|---|
| 9,558,297 B1 * | 1/2017 | Bailey | G06F 12/023 |
| 10,503,784 B1 * | 12/2019 | Dean | G06F 16/26 |
| 2006/0173873 A1 * | 8/2006 | Prompt | G06F 16/284 |
| 2007/0011146 A1 * | 1/2007 | Holbrook | G06Q 30/0603 |
| 2016/0299991 A1 * | 10/2016 | Hong | G06F 16/2246 |
| 2017/0242935 A1 * | 8/2017 | Wragg | G05B 19/0423 |
| 2019/0288847 A1 * | 9/2019 | Beckmann | H04L 9/3247 |
| 2022/0269649 A1 * | 8/2022 | Moussa | G06F 16/185 |

OTHER PUBLICATIONS

Oracle, "REST API for Oracle Service Cloud: Paginating" (2018), Oracle (Year: 2018).*

* cited by examiner

*Primary Examiner* — Tamara T Kyle
*Assistant Examiner* — Lana Alagic
(74) *Attorney, Agent, or Firm* — Mintz Levin Cohn Ferris Glovsky and Popeo, P.C.

(57) ABSTRACT

In some implementations, the method includes receiving data characterizing a user request indicative of retrieval of a portion of a hierarchical dataset associated with a hierarchical industrial asset and stored in a partition of a database. The user request includes pagination criteria and a search parameter. The method also includes selecting the portion of the hierarchical dataset based on the search parameter. The method further includes generating a plurality of data subsets from at least the portion of the hierarchical dataset. The searching is based on a threshold data subset size included in the pagination criteria. The generating includes dividing the portion of the hierarchical subset into the plurality of data subsets. The size of each data subset of the plurality of data subsets is less than the threshold data subset size. The method further includes providing the plurality of data subsets.

21 Claims, 6 Drawing Sheets

300

| | 322 User-defined Asset/ Edge ID | 324 Hash ID | 326 Local ID | 328 Partition ID |
|---|---|---|---|---|
| 302 | TM 001 | Hash ID #1 | 001 | 1 |
| 304 | TM 002 | Hash ID #2 | 002 | 1 |
| 306 | TM 003 | Hash ID #3 | 003 | 1 |
| 308 | TM 004 | Hash ID #4 | 004 | 1 |
| 310 | TM 005 | Hash ID #5 | 005 | 1 |
| 312 | TM 006 | Hash ID #6 | 006 | 1 |
| 314 | TM 007 | Hash ID #7 | 007 | 1 |
| 316 | JP001 | Hash ID #8 | 001 | 2 |
| 318 | JP002 | Hash ID #9 | 002 | 2 |

FIG. 3

| Asset / Edge Name | Hash ID | Local ID | Partition ID | Asset Type | Asset Information | Asset Layer |
|---|---|---|---|---|---|---|
| System 1 | Hash ID #1 | 001 | 1 | Enterprise | Location | 4 |
| System 2 | Hash ID #2 | 002 | 1 | Machine Train | Pressure | 3 |
| Link 1 | Hash ID #3 | 003 | 1 | E1 Link | | |
| System 3 | Hash ID #4 | 004 | 1 | Machine | Temp | 2 |
| Link 2 | Hash ID #5 | 005 | 1 | E2 Link | | |
| System 4 | Hash ID #6 | 006 | 1 | Bearing | Temp | 1 |
| Link 3 | Hash ID #7 | 007 | 1 | E1 Link | | |

FIG. 4

| Edge Name | Hash ID | Local ID | Source ID | Target ID | Edge Type |
|---|---|---|---|---|---|
| Link 1 | Hash ID #3 | 003 | 001 | 002 | E1 Link |
| Link 2 | Hash ID #5 | 005 | 002 | 004 | E2 Link |
| Link 3 | Hash ID #7 | 007 | 004 | 006 | E1 Link |

FIG. 5

DATA RETRIEVAL FROM HIERARCHICAL INDUSTRIAL ASSET DATASETS

BACKGROUND

A database is an organized collection of structured information, or data, typically stored electronically in a computer system. Data within a database can be modeled in rows and columns (e.g., in a series of tables) to make processing and data querying efficient. The data can then be easily accessed, managed, modified, updated, controlled, and organized.

The database management system (DBMS) is the software that interacts with end users, applications, and the database itself to capture and analyze the data. The DBMS software additionally encompasses the core facilities provided to administer the database. In some implementations, the DBMS can includes computer hardware running system software for creating and managing databases. The DBMS provides users and programmers with a systematic way to create, retrieve update and manage data in a database. Examples of databases include relational database, flat database, object oriented database, hierarchical database, and the like.

SUMMARY

Various aspects of the disclosed subject matter may provide one or more of the following capabilities.

In some implementations, the method includes receiving data characterizing a user request indicative of retrieval of a portion of a hierarchical dataset associated with a hierarchical industrial asset and stored in a partition of a database. The user request includes pagination criteria and a search parameter. The method also includes selecting the portion of the hierarchical dataset based on the search parameter. The method further includes generating a plurality of data subsets from at least the portion of the hierarchical dataset. The searching is based on a threshold data subset size included in the pagination criteria. The generating includes dividing the portion of the hierarchical subset into the plurality of data subsets. The size of each data subset of the plurality of data subsets is less than the threshold data subset size. The method further includes providing the plurality of data subsets.

One or more of the following features can be included in any feasible combination.

In some implementations, the hierarchical dataset includes a plurality of node data comprising a plurality of asset data and a plurality of edge data. Each asset datum of the plurality of node data represents an asset in the hierarchical industrial asset and each edge datum of the plurality of edge data represents an edge in the hierarchical industrial asset. In some implementations, each asset datum of the plurality of asset data includes a layer value, and generating the plurality of data subsets is based on layer values of asset data in the data subsets of the plurality of data subsets.

In some implementations, generating the plurality of data subsets includes generating a first data subset that includes a first set of asset data of the selected portion of the hierarchical dataset having a first layer value, and generating a second data subset that includes a second set of asset data of the selected portion of the hierarchical dataset having a second layer value. In some implementations, providing the plurality of data subsets includes providing the first data subset prior to the second data subset, wherein the first layer value is greater than the second layer value. In some implementations, a first sum of data size of asset data in the first set of asset data is less than the threshold data subset size, and a second sum of data size of asset data in the second set of asset data is less than the threshold data subset size.

In some implementations, the search parameter includes an initial asset name associated with a first asset datum and a final asset name associated with a second asset datum. The portion of the hierarchical dataset includes the first asset datum, the second asset datum and a hierarchical chain of asset connected by one or more edge data. In some implementations, the search parameter includes an asset type. The portion of the hierarchical dataset includes a set of asset data of the plurality of asset data including the asset type.

In some implementations, the plurality of asset data is stored in a node table in the partition of the database. The node table includes a plurality of rows and a plurality of columns, and each asset datum of the plurality of asset data includes a plurality of asset properties. A first asset datum of the plurality of asset data is assigned a first row of the plurality of rows. A first asset property of the first asset datum is assigned a first column of the plurality of columns and a second asset property of the first asset datum is assigned a second column of the plurality of columns. In some implementations, the plurality of edge data is stored in the node table, and each edge datum of the plurality of edge data includes a plurality of edge properties. A first edge datum of the plurality of edge data is assigned a second row of the plurality of rows. A first edge property of the first edge datum is assigned a third column of the plurality of columns and a second edge property of the first edge datum is assigned a fourth column of the plurality of columns.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which:

FIG. 3 illustrates an exemplary hash table associated with a database;

FIG. 4 illustrates an exemplary node table stored in a partition of the database of FIG. 3;

FIG. 5 illustrates an exemplary edge map table stored in the partition of the database of FIG. 3.

DETAILED DESCRIPTION

Figure 1:
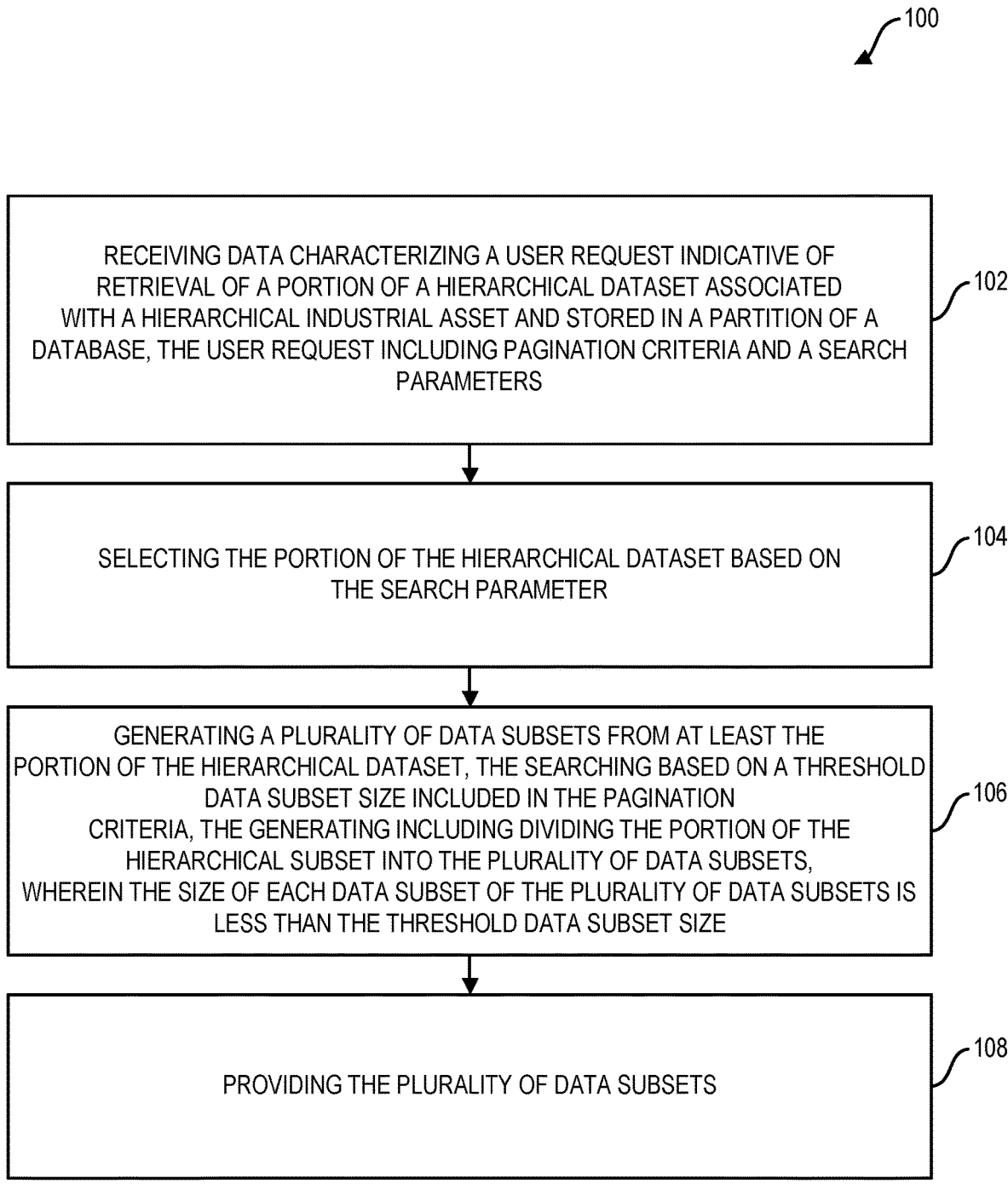
FIG. 1 is a flow chart of an exemplary method for retrieving data from a hierarchical industrial dataset.

Industrial sites (e.g., oil and gas industrial sites) can include multiple industrial assets (e.g., machines, motors, drills, etc.). The industrial assets can be operationally or physically related to each other. For example, a first asset can be a part of a second asset, the output of the first asset can be an input to the second asset, the first asset can be mechanically coupled to the second asset, etc. In some implementations, the industrial assets at an industrial site can form a hierarchy (e.g., a primary asset can include multiple secondary assets which in turn can include multiple tertiary assets and/or output of multiple secondary assets can be directed to a primary assets). For a given industrial site, a large amount of operational data (e.g., operating parameters of the industrial assets, sensor measurements at the industrial assets, etc.) and relational data (e.g., hierarchical relationship of the industrial assets) can be generated. In some implementations, the operational and/or relational data of a hierarchical industrial asset can be stored in a single partition of the database. It can be desirable to efficiently and selectively retrieve operational and/or relation data of hierarchical industrial assets from the database.

Selectively retrieving data from a large volume of data in the database can be challenging. For example, a user may want to selectively retrieve data based on hierarchical relational data of the industrial assets. In some implementations, the data selected for retrieval can have a large size and it may not be desirable to transfer all of the selected data to the user in a single transmission. Instead it may be desirable to divide the selected data into multiple divisions (or data subsets) and transfer one division at a time to the user. Additionally, it may be desirable to divide the selected data based on predetermined properties of the data. For example, it can be desirable that a data subset includes data of those hierarchical industrial assets that share a predetermined property (e.g., hierarchical industrial assets belonging to the same layer of the hierarchical industrial asset). Existing database management systems (DBMS) may not efficiently handle selectively retrieval of data from a hierarchical industrial asset dataset.

Some implementations of current subject matter includes selective retrieval of data from hierarchical industrial asset dataset. A user can control the retrieval process. For example, the user can instruct the DBMS to retrieve associated with a desired type of assets, assets having a predetermined hierarchical relation, and the like. In some implementations, the user can instruct the DBMS to generate customized response to retrieval request. For example, the user can instruct the DBMS to divide the retrieval result into a multiple data subset (e.g., based on parameters provided by the user) and send the segments (e.g., sequentially) or customized paginated response. The user can determine a maximum threshold data size associated with data subset, and the properties of the hierarchical industrial assets data included in the data subset.

FIG. 1 is a flow chart of an exemplary method for retrieving data from a hierarchical industrial dataset. At step 102, data characterizing a user request indicative of retrieval of at least a portion of data is received from a hierarchical dataset associated with hierarchical industrial assets is received. The hierarchical dataset is stored in a partition of the database. The hierarchical dataset includes a plurality of node data that can include a plurality of asset data and a plurality of edge data. Each asset datum of the plurality of asset data represents an asset in the hierarchical industrial asset and each edge datum of the plurality of edge data represents an edge in the hierarchical industrial asset. The user request can include various information related to the search on the hierarchical dataset. For example, the user request can include one or more search parameters (e.g., asset name, asset type, etc.) based on which the search of the hierarchical dataset can be performed (e.g., by the DBMS). The user request can include pagination criteria based on which the search results (e.g., generated based on the one or more search parameters) can be divided into multiple data subsets and provided to the customer (e.g., sequentially). In some implementations, the user request can include a partition identifier indicative of the partition of the database where the hierarchical dataset is stored.

Figure 2:
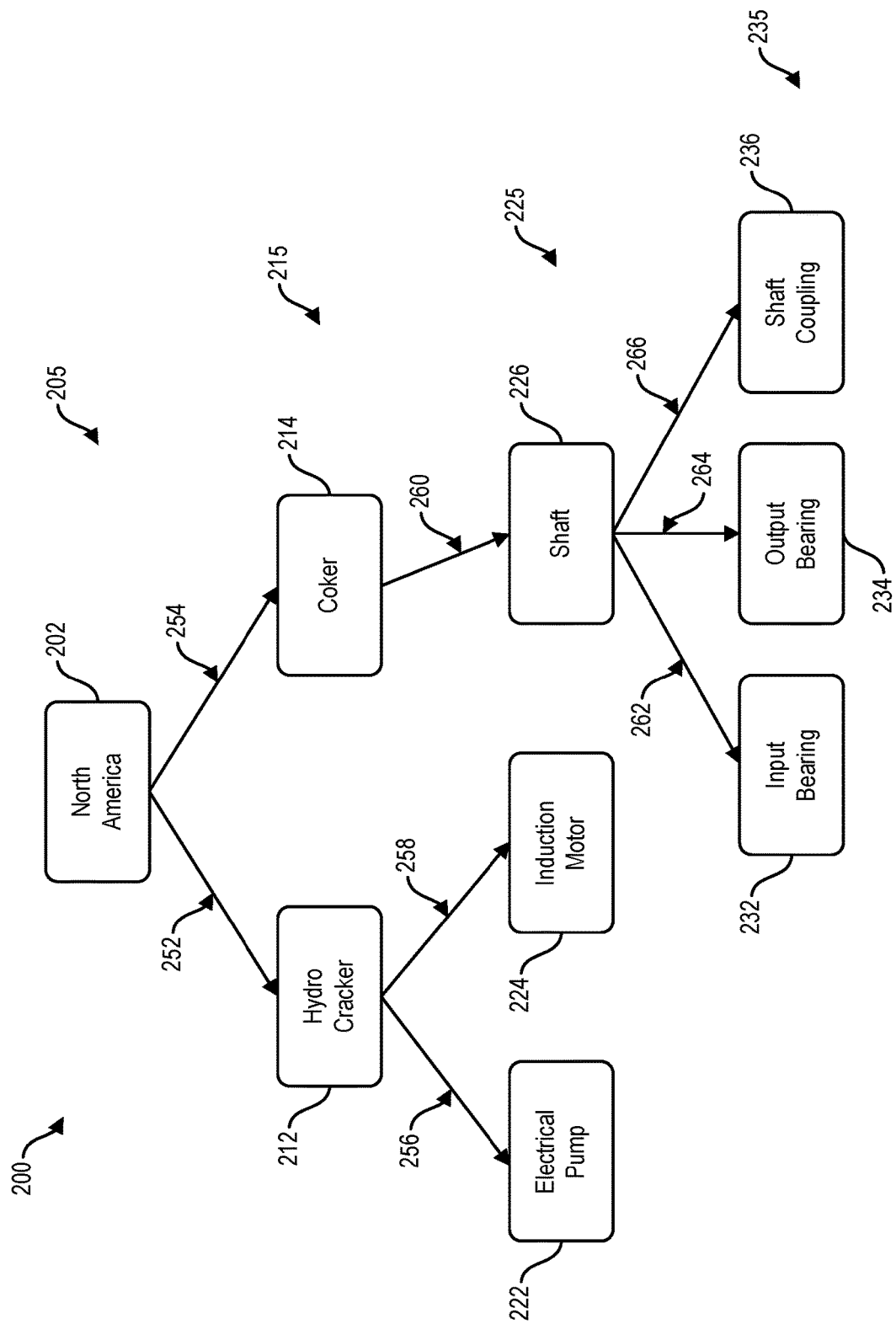
FIG. 2 illustrates an exemplary framework for retrieving data from a hierarchical industrial dataset.

FIG. 2 illustrates an exemplary schematic framework of a hierarchical industrial asset 200. The hierarchical industrial asset includes multiple interrelated assets 202-236 that form a hierarchy. The relationship between a pair of assets is described by an edge. An asset is represented by a rectangular shape and an edge is represented by an arrow. The hierarchical industrial asset 200 can include multiple asset layers associated with the various hierarchies. Each asset layer can include multiple assets. For example, the hierarchical industrial asset 200 can include a first asset layer 205, a second asset layer 215, a third asset layer 225 and a fourth asset layer 235. Each asset layer can include one or more assets. For example, the first asset layer 205 includes a North America site 202; the second asset layer 215 includes a hydro cracker 212 and a coker unit 214; the third asset layer includes an electrical pump 222, and induction motor 224 and a shaft 226; and the fourth asset layer 235 includes an input bearing 232, an output bearing 234 and a shaft coupling 236. In some implementations, an edge originates from a first asset in a first layer and terminates at a second asset in a second layer. For example, the first asset layer 205, the second asset layer 215, the third asset layer 225 and the fourth asset layer 235 are arranged in the order of decreasing hierarchical value (e.g., assets in the first asset layer 205 can have the highest hierarchical value and assets in the fourth asset layer 235 can have lowest hierarchical value in the hierarchical industrial asset 200).

The various assets can have an asset type. For example, the North America site 202 is an enterprise (e.g., indicative of the name/location of the hierarchical industrial asset 200). The hydro cracker 212 and coker unit 214 are machine trains; electrical pump 222, induction motor 224, shaft 226 and shaft coupling 236 are machines; and input bearing 232 and output bearing 234 are bearings. The various assets can be interrelated and the relation between a pair of assets can be represented by an edge (e.g., one of edges 252-264). For example, edge 252 and edge 254 represent the relationship between North America site 202 and hydro cracker 212 and coker 214, respectively (e.g., that hydro cracker 212 and coker unit 214 are located at the North America site). Edge 260 represents relationship between coker unit 214 and shaft 226, and edge 262 represents a relationship between shaft 226 and input bearing 232. Together, assets that are interconnected by one or more edges can be described as forming a hierarchical chain. For example, North America site 202, coker unit 214, shaft 226 and input bearing 232 that are connected by edges 254, 260 and 262 can be described as forming a hierarchical chain.

The hierarchical dataset associated with the hierarchical industrial asset 200 can include a plurality of node data. The plurality of node data can include asset data associated with the different assets (e.g., assets 202-236) of the hierarchical industrial asset 200. The plurality of node data can also include a plurality of edge data that include data associated with the different edges (e.g., edges 252-266) of the hierarchical industrial asset 200. An edge datum of the plurality of edge data is indicative of a relation between a pair of asset data of the plurality of asset data. For example, a first edge data associated with the edge 252 (or edge 254) can be indicative of relation between North America site and hydro cracker 252 (or coker unit 214). In some implementations, each asset datum of the plurality of asset data represents an asset in the hierarchical industrial asset 200 and each edge datum of the plurality of edge data represents an edge in the hierarchical industrial asset 200.

The hierarchical dataset can include various information associated with the assets and/or edges of the hierarchical industrial asset provided by the user (e.g., user-defined asset/edge identifier (ID), asset type, asset properties, etc.). For example, the hierarchical dataset can include a plurality of user-defined asset/edge identifiers where each user-defined asset identifier of the plurality of user-defined asset identifiers is indicative of a unique asset or a unique edge of the hierarchical industrial asset. The asset/edge identifier are provided by the user and the user can use it to track and retrieve asset data from the database. The asset/edge ID can be identifiers associated with asset/edge can be assigned by the user (or customer operating the industrial asset). The user can use the assigned asset/edge IDs to retrieve asset/edge data from the database. The asset properties can include, for example, operational information of the assets (e.g., operation parameters, temperature, pressure, etc.).

In addition, new properties can be assigned to the hierarchical dataset (e.g., by the DBMS). For example, a unique hash identifier can be generated for each user-defined asset/edge identifiers. An asset data in the database can be identified based on its hash identifier. A local identifier can also be assigned to each asset data stored in a partition (e.g., by the DBMS). For example, a first set of local identifiers can be assigned to asset/edge data of a hierarchical dataset stored in a partition. Each local identifier of the first set of local identifier is associated with a unique asset datum or a unique edge datum in the hierarchical dataset. In some implementations, an asset layer value can be assigned to the various asset data in the hierarchical dataset. The asset layer value can be based on the hierarchical value of the asset layer. For example, asset layer with the highest hierarchical value can be assigned the largest asset layer value and the asset layer with the lowest hierarchical value can be assigned the smallest asset layer value.

The database can be divided into one or more partitions. A partition of the database can be identified based on a partition identifier (e.g., generated by the DBMS and provided to the user). In some implementations, the user request can include the partition identifier. The DBMS can be configured to store the entire hierarchical dataset of the hierarchical industrial asset in a single partition (e.g., based on instruction provided to the DBMS by a user). The user can use the partition identifier to retrieve data stored in the partition (e.g., by including the partition identifier included in the user request received at step 102). For example, the user can provide the partition identifier to the DBMS that can be indicative of the partition of the dataset where the hierarchical dataset can be stored.

The information in a hierarchical dataset can be stored in multiple tables (e.g., hash table, node table, edge map table, etc.) of the database. In some implementations, the database can have a single hash table that includes identification information (e.g., hash identifier) of assets/edges of multiple hierarchical dataset stored in the database (e.g., where any given hierarchical dataset is stored in one partition of the database). The hash table can also store the partition identifiers for the assets. Based on the partition identifier, the partition where the asset information is stored can be identified. In some implementations, each partition of the database can include a node table that stores various information associated with the nodes of the hierarchical industrial asset. The nodes can include assets (e.g., assets 202-236) and edges (e.g., 252-264). For example, the node table of a partition can include the name, the hash identifier, the local identifier, the partition identifier, the type, information (e.g., operational parameters), etc., of the various assets/edges whose data is stored in the partition. In some implementations, each partition can include an edge map table. The edge map table can include relational information associated with the edges. For example, the edge map table can include the local identifiers of the assets that are connected by an edge.

FIG. 3 illustrates an exemplary hash table 300. Each node (e.g., asset, edge, etc.) can be assigned a row of the hash table 300 (e.g., asset TM 001 having hash id #1 is assigned row 302, asset TM 002 having hash id #2 is assigned row 304, etc.). The hash table can further include multiple columns that store various asset properties associated with a given asset. For example, column 322, column 324, column 326 and column 328 are assigned to user-defined asset/edge identifiers, hash identifiers, local identifiers and partition identifiers, respectively, of the asset/edge data stored in the various rows. The hash identifiers can be generated by hashing the user-defined asset/edge identifiers (e.g., by a mathematical algorithm). The generated hash identifiers are stored in column 324 of the hash table 300 such that each row includes the user-defined asset/edge identifier and the hash identifier generated by hashing the user-defined asset/edge identifier (e.g., TM 001 and hash Id #1 generated by hashing TM 001 are stored in row 302 and TM 002 and hash Id #2 generated by hashing TM 002 are stored in row 304, etc.). The hash table 300 also includes identification information of assets JP 001 and JP 002 (with partition ID 2) that are stored in a partition different from that in which assets TM 001 and TM002 (with partition ID 1). In some implementations, assets/edge data in different partitions can have the same value for the local identifier. For example, asset TM 001 and JP 001 have 001 as their local identifier.

FIG. 4 illustrates an exemplary node table 400 which is stored in a partition having the partition identifier 1. Each node (e.g., asset, edge, etc.) can be assigned a row in the node table 400 (e.g., an asset with the name System 1 having hash id #1 is assigned row 402, edge with the name Link 1 having hash id #3 is assigned row 406, etc.). The node table can further include multiple columns that store various node (e.g., asset, edge, etc.) properties associated with the nodes. For example, column 422, column 424, column 426 column 428, column 430, column 432 and column 434 are assigned to asset/edge name, hash identifier, local identifier, partition identifier, type, information of the asset/edge data stored in the various rows, and asset layer, respectively. As illustrated in FIG. 4, System 1 (e.g., North America site 202) has the highest hierarchical value and is assigned the largest asset layer value (e.g., 4), and System 4 (e.g., input bearing 232, output bearing 234, etc.) has the lowest hierarchical value and is assigned the smallest asset layer value (e.g., 1). System 2 (e.g., Coker unit 214) can be assigned an asset layer value of 3 and System 3 (e.g., shaft 226) is assigned an asset layer value of 2.

For example, a first asset datum (e.g., data for System 1) of the plurality of asset data is assigned a first row (e.g., row 402) of the plurality of rows. A first asset property (e.g., asset/edge name, hash id, local id, etc.) of the first asset datum is assigned a first column (e.g., column 422, 424, 426, etc.) of the plurality of columns. In another example, a first edge datum (e.g., data for Link 1) of the plurality of edge data is assigned a third row (e.g., row 406) of the plurality of rows. A first edge property (e.g., asset/edge name, hash id, local id, etc.) of the first edge datum is assigned a first column (e.g., column 422, 424, 426, etc.) of the plurality of columns.

FIG. 5 illustrates an exemplary edge map table 500 which is stored in a partition having the partition identifier 1. Each edge can be assigned a row in the edge map table 500 (e.g., an edge with the name Link 1 having hash id #3 is assigned row 502, edge with the name Link 2 having hash id #5 is assigned row 504, etc.). The edge map table can further include multiple columns that store various mapping properties associated with a given edge. For example, column 512, column 514, column 516 and column 522 are assigned to edge name, hash identifier, local identifier, and edge type, respectively. Column 518 is assigned to source identifier (or local identifier of the asset from which an edge originates) and column 520 is assigned to target identifier (or local identifier of the asset at which the edge terminates). For example, for edge 260 (in FIG. 2), the source identifier is the local identifier of the coker unit 214 and the target identifier is the local identifier of the shaft 226.

Returning back to FIG. 1, at step 104, a portion of the hierarchical dataset is selected based on the one or more search parameters. In some implementations, the one or more search parameters can include an initial asset name associated with a first asset datum and a final asset name associated with a second asset datum. Based on the initial and the final asset name a portion of the hierarchical dataset that includes the first asset datum, the second asset datum and a hierarchical chain of asset connected by one or more edge data can be selected. For example, the initial asset name can be the user defined asset identifier of North America site 202 (e.g., TM 001) and the final asset name can be the user defined asset identifier of input bearing 232 (e.g., TM 006). Based on the initial and final asset names, a hierarchical chain of assets that are relationally located between the first asset and the final asset can be selected. For example, coker unit 214 is related to North America site 202 via the edge 254, the shaft 226 is related to the coker unit 214 via the edge 260, and the input bearing 232 is related to the shaft 226 via the edge 262. The hierarchical chain of assets located between the North America site 202 and input bearing 232 includes coker unit 214 and shaft 226.

In some implementations, the one or more search parameters includes an asset type. The selected portion of the hierarchical dataset can include a set of asset data of the plurality of asset data that include the asset type. For example, the search parameters in the user request includes the asset type "machine" (e.g., for a query on the hierarchical dataset associated with hierarchical industrial asset illustrated in FIG. 2). Based on this search parameter, the asset data associated with electrical pump 222, induction motor 224, shaft 226 and shaft coupling 236 that includes "machine" as the asset type. In some implementations, asset data can be searched based on one or more asset properties (e.g., asset type, asset information, asset layer, or a combination thereof).

In some implementations, the one or more search parameter includes a single asset name (e.g., TM 002 associated with coker unit 214). Based on this search parameter, asset data of all the assets that lie below the asset with the asset name in the hierarchical chain can be selected. For example, if coker unit 214 is selected, asset data associated with shaft 226, input bearing 232, output bearing 234 and shaft coupling 236 can be selected from the hierarchical dataset.

Returning back to FIG. 1, at step 106, a plurality of data subsets can be generated from the selected portion of the hierarchical dataset (or search result). This can be done when the size of the search result is large and not suitable to be transmitted in a single transmission. For example, transmitting a large search result may be take a long time and may require the user to wait for the transmission of the entire search result. In some implementations, the user may want to divide the search result based on predetermined criteria (e.g., based on properties of data in the search result). The data subsets can be generated by grouping the search result based on the predetermined criteria.

In some implementations, the user request received at step 102 can include pagination criteria based on which the plurality of data subsets are generated. For example, the pagination criteria can include a threshold data subset size. The various data subsets sizes are generated such that their data size is less than the threshold data subset size. In some implementations, the number of data subset can be calculated by dividing the total size of the search result by the threshold data subset size and round the result to the higher integer.

The search result can be divided in the data subsets based on properties of the asset data. In some implementations, the division of search results can be based on the asset layer values of the asset data in the search results. A given data subset can include node data (e.g., asset data) having the same asset layer value or having asset layer values with a predetermined range (e.g., the predetermined range of asset values can be included in the pagination criteria). For example, a first data subset that includes a first set of asset data of the selected portion of the hierarchical dataset having a first layer value can be generated (e.g., by the DBMS). The sum of data size in the first set of asset data is less than the threshold data subset size. Similarly, a second data subset that includes a second set of asset data of the selected portion of the hierarchical dataset having a second layer value can be generated. The sum of data size in the second set of asset data is less than the threshold data subset size.

Returning back to FIG. 1, at step 108 the plurality of data subsets (e.g., generated at step 106) can be provided (e.g., sequentially provided by the DBMS to the user requesting data retrieval). For example, the transmission of two data subsets can be temporally separated by a time period. In some implementations, the sequence in which the data subsets are transmitted can be determined based on ordering parameters included in the pagination criteria. In some implementations, the ordering parameter can include a sequence of asset layer values based on which the data subset with asset data having a given asset layer value are transmitted. For example, the sequence of asset layer values can include the sequence {4, 3, 2, 1}. Based on this sequence, data subsets with asset data having asset layer value 4 is transmitted first and data subsets with asset data having asset layer value 1 is transmitted last.

Figure 6:
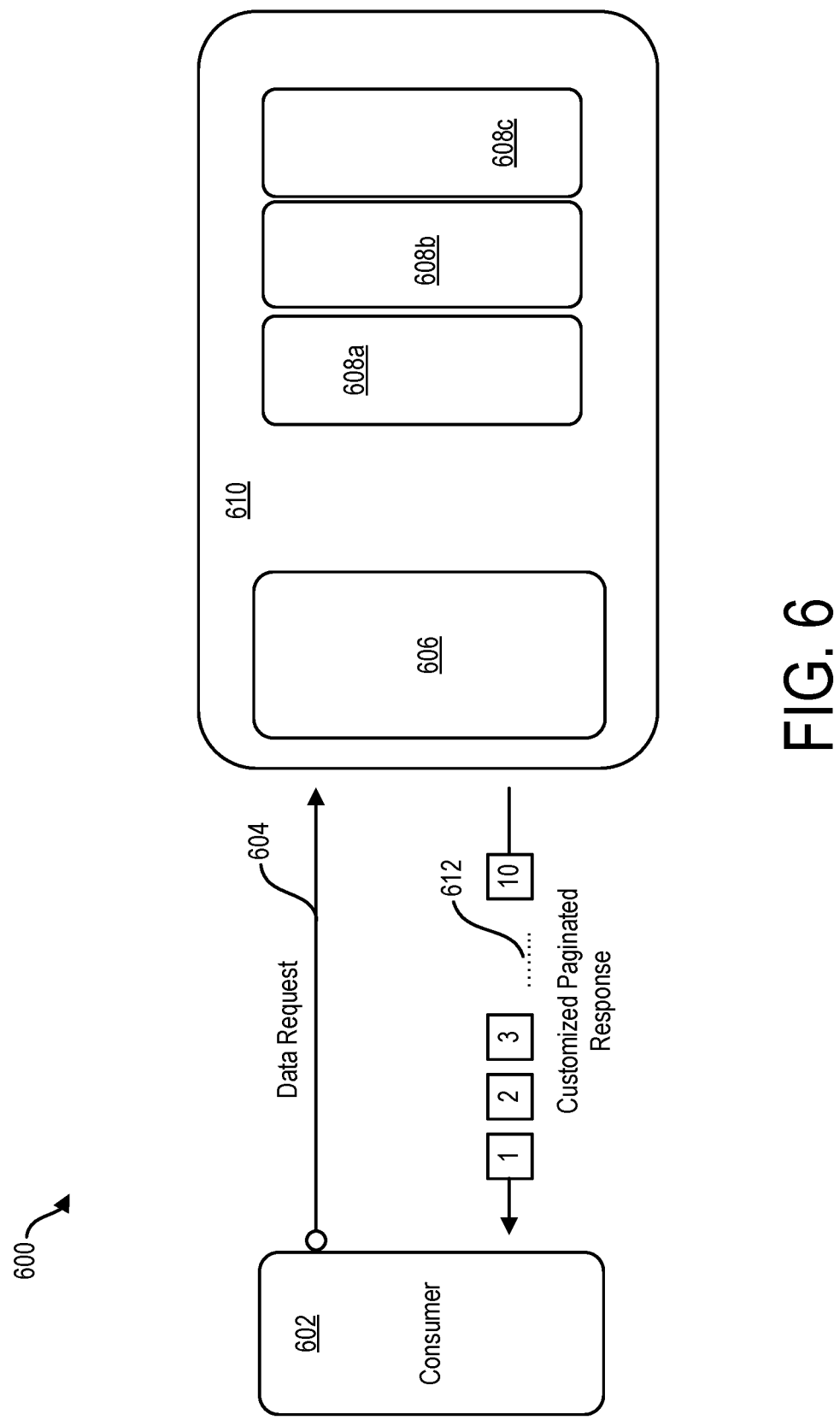
FIG. 6 illustrates an exemplary schematic for retrieval of data from hierarchical dataset.

FIG. 6 illustrates an exemplary schematic 600 for retrieval of data from hierarchical dataset. The user 602 can provide a user request 604 to a DBMS 606 for retrieval of a portion of hierarchical dataset stored in the database 610 (e.g., stored in a partition of the database 610.). For example, the hierarchical dataset can be stored in one of the partitions 608a-608c of the database 610. The DBMS can select the portion of the hierarchical dataset based on search parameters included in the user request 604. The DBMS can generate a plurality of data subsets from the selected portion of the hierarchical dataset. The plurality of data subsets can be ordered and provided (e.g., sequentially) to the user 602 via transmission 612.

In some implementations, source code can be human-readable code that can be written in program languages such as python, C++, etc. In some implementations, computer-executable codes can be machine-readable codes that can be generated by compiling one or more source codes. Computer-executable codes can be executed by operating systems (e.g., linux, windows, mac, etc.) of a computing device or distributed computing system. For example, computer-executable codes can include data needed to create runtime environment (e.g., binary machine code) that can be executed on the processors of the computing system or the distributed computing system.

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
    controlling, by one or more processors, a detection of operational data, by using one or more sensors, the operational data comprising sensor measurements indicative of operations of industrial assets;
    storing, by the one or more processors, the operational data, in a node table of a hierarchical dataset, stored in a partition of a database, the node table comprising a plurality of rows and a plurality of columns, each asset datum of a plurality of asset data comprising a plurality of asset properties characterizing the industrial assets, wherein the hierarchical dataset comprises a plurality of node data comprising a plurality of asset data and a plurality of edge data indicative of a relation between a pair of asset data of the plurality of asset data;
    receiving, by the one or more processors, data characterizing a user request indicative of retrieval of a portion of the hierarchical dataset associated with a hierarchical industrial asset, the user request comprising pagination criteria and a search parameter;
    selecting, by the one or more processors, the portion of the hierarchical dataset based on the search parameter;
    dividing, by the one or more processors, the portion of the hierarchical dataset into a plurality of data subsets to generate the plurality of data subsets from at least the portion of the hierarchical dataset-based on a threshold data subset size included in the pagination criteria and based on a structure of the hierarchical dataset arranged in an order of decreasing hierarchical value, wherein a size of each data subset of the plurality of data subsets is less than the threshold data subset size; and
    providing, by the one or more processors to a user device, the plurality of data subsets in a sequential order.

2. The method of claim 1, wherein each asset datum of the plurality of node data represents an asset in the hierarchical industrial asset and each edge datum of the plurality of edge data represents an edge in the hierarchical industrial asset.

3. The method of claim 2, wherein each asset datum of the plurality of asset data comprises a layer value, wherein generating the plurality of data subsets is based on layer values of asset data in the data subsets of the plurality of data subsets.

4. The method of claim 3, wherein generating the plurality of data sub sets comprises:
    generating a first data subset comprising a first set of asset data of the portion of the hierarchical dataset having a first layer value,
    generating a second data subset comprising a second set of asset data of the portion of the hierarchical dataset having a second layer value.

5. The method of claim 4, wherein providing the plurality of data subsets comprises providing the first data subset prior to the second data subset, wherein the first layer value is greater than the second layer value.

6. The method of claim 4, wherein the pagination criteria comprises an ordering parameter comprising a transmission sequence.

7. The method of claim 2, wherein the search parameter comprises an initial asset name associated with a first asset datum and a final asset name associated with a second asset datum,
    wherein the portion of the hierarchical dataset comprises the first asset datum, the second asset datum and a hierarchical chain of asset connected by one or more edge data.

8. The method of claim 2, wherein the search parameter comprises an asset type, wherein the portion of the hierarchical dataset comprises a set of asset data of the plurality of asset data comprising the asset type.

9. The method of claim 2, wherein a first asset datum of the plurality of asset data is assigned a first row of the plurality of rows, and
    wherein a first asset property of the first asset datum is assigned a first column of the plurality of columns and a second asset property of the first asset datum is assigned a second column of the plurality of columns.

10. The method of claim 9, wherein the plurality of edge data is stored in the node table, each edge datum of the plurality of edge data comprising a plurality of edge properties,
    wherein a first edge datum of the plurality of edge data is assigned a second row of the plurality of rows,
    wherein a first edge property of the first edge datum is assigned a third column of the plurality of columns and a second edge property of the first edge datum is assigned a fourth column of the plurality of columns.

11. A system comprising:
    at least one data processor;
    memory coupled to the at least one data processor, the memory storing instructions to cause the at least one data processor to perform operations comprising:
        controlling a detection of operational data, by using one or more sensors, the operational data comprising sensor measurements indicative of operations of industrial assets;

storing the operational data, in a node table of a hierarchical dataset, stored in a partition of a database, the node table comprising a plurality of rows and a plurality of columns, each asset datum of a plurality of asset data comprising a plurality of asset properties characterizing the industrial assets, wherein the hierarchical dataset comprises a plurality of node data comprising a plurality of asset data and a plurality of edge data indicative of a relation between a pair of asset data of the plurality of asset data;

receiving data characterizing a user request indicative of retrieval of a portion of the hierarchical dataset associated with a hierarchical industrial asset, the user request comprising pagination criteria and a search parameter;

selecting the portion of the hierarchical dataset based on the search parameter;

dividing the portion of the hierarchical dataset into a plurality of data subsets to generate the plurality of data subsets from at least the portion of the hierarchical dataset-based on a threshold data subset size included in the pagination criteria and based on a structure of the hierarchical dataset arranged in an order of decreasing hierarchical value, wherein a size of each data subset of the plurality of data subsets is less than the threshold data subset size; and providing, to a user device, the plurality of data subsets in a sequential order.

12. The system of claim 11, wherein each asset datum of the plurality of node data represents an asset in the hierarchical industrial asset and each edge datum of the plurality of edge data represents an edge in the hierarchical industrial asset.

13. The system of claim 12, wherein each asset datum of the plurality of asset data includes a layer value, wherein generating the plurality of data subsets is based on layer values of asset data in the data subsets of the plurality of data subsets.

14. The system of claim 13, wherein generating the plurality of data sub sets comprises:

generating a first data subset comprising a first set of asset data of the portion of the hierarchical dataset having a first layer value, generating a second data subset comprising a second set of asset data of the portion of the hierarchical dataset having a second layer value.

15. The system of claim 14, wherein providing the plurality of data subsets comprises providing the first data subset prior to the second data subset, wherein the first layer value is greater than the second layer value.

16. The system of claim 14, wherein the pagination criteria comprises an ordering parameter comprising a transmission sequence.

17. The system of claim 12, wherein the search parameter comprises an initial asset name associated with a first asset datum and a final asset name associated with a second asset datum, wherein the portion of the hierarchical dataset comprises the first asset datum, the second asset datum and a hierarchical chain of asset connected by one or more edge data.

18. The system of claim 12, wherein the search parameter comprises an asset type, wherein the portion of the hierarchical dataset comprises a set of asset data of the plurality of asset data comprising the asset type.

19. The system of claim 12, wherein a first asset datum of the plurality of asset data is assigned a first row of the plurality of rows, and wherein a first asset property of the first asset datum is assigned a first column of the plurality of columns and a second asset property of the first asset datum is assigned a second column of the plurality of columns.

20. The system of claim 12, wherein the plurality of edge data is stored in the node table, each edge datum of the plurality of edge data comprising a plurality of edge properties, wherein a first edge datum of the plurality of edge data is assigned a second row of the plurality of rows, wherein a first edge property of the first edge datum is assigned a third column of the plurality of columns and a second edge property of the first edge datum is assigned a fourth column of the plurality of columns.

21. A computer program product comprising a non-transitory machine-readable medium storing instructions that, when executed by at least one programmable processor that comprises at least one physical core and a plurality of logical cores, cause the at least one programmable processor to perform operations comprising:

controlling a detection of operational data, by using one or more sensors, the operational data comprising sensor measurements indicative of operations of industrial assets;

storing the operational data, in a node table of a hierarchical dataset, stored in a partition of a database, the node table comprising a plurality of rows and a plurality of columns, each asset datum of a plurality of asset data comprising a plurality of asset properties characterizing the industrial assets, wherein the hierarchical dataset comprises a plurality of node data comprising a plurality of asset data and a plurality of edge data indicative of a relation between a pair of asset data of the plurality of asset data;

receiving data characterizing a user request indicative of retrieval of a portion of the hierarchical dataset associated with a hierarchical industrial asset, the user request comprising pagination criteria and a search parameter;

selecting the portion of the hierarchical dataset based on the search parameter;

dividing the portion of the hierarchical dataset into a plurality of data subsets to generate the plurality of data subsets from at least the portion of the hierarchical dataset-based on a threshold data subset size included in the pagination criteria and based on a structure of the hierarchical dataset arranged in an order of decreasing hierarchical value, wherein a size of each data subset of the plurality of data subsets is less than the threshold data subset size; and providing, to a user device, the plurality of data subsets in a sequential order.

* * * * *